(12) United States Patent
Peuker (10) Patent No.: US 9,486,721 B2
(45) Date of Patent: Nov. 8, 2016

(54) FILTER DEVICE, METHOD FOR ITS OPERATION AND USE THEREOF

(75) Inventor: Urs Peuker, Freiberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 413 days.

(21) Appl. No.: 13/462,145

(22) Filed: May 2, 2012

(65) Prior Publication Data

US 2012/0273432 A1    Nov. 1, 2012

(51) Int. Cl.
| | |
|---|---|
| B01D 33/06 | (2006.01) |
| B01D 33/09 | (2006.01) |
| B01D 33/073 | (2006.01) |
| B01D 33/60 | (2006.01) |
| B01D 33/66 | (2006.01) |

(52) U.S. Cl.
CPC ............ *B01D 33/09* (2013.01); *B01D 33/073* (2013.01); *B01D 33/60* (2013.01); *B01D 33/663* (2013.01)

(58) Field of Classification Search
CPC .... B01D 33/073; B01D 33/58; B01D 33/60; B01D 33/62; B01D 33/663; B01D 33/807; B01D 33/808; B01D 33/809; B01D 33/0016; B01D 33/466; B01D 2201/282; B01D 33/76; B01D 33/804; B01D 33/0064; B01D 33/00; B01D 33/68; B01D 2201/204; B01D 29/86; C10C 3/00; C10C 3/026; C10C 3/18; C02F 11/121; C02F 11/123; C02F 11/126; C02F 11/14
USPC ....... 210/741, 402, 406, 409, 391, 772, 771, 210/769, 742, 783, 784; 585/864
See application file for complete search history.

(56) References Cited

U.S. PATENT DOCUMENTS

| | | | |
|---|---|---|---|
| 3,319,789 A | 5/1967 | Brown | 210/67 |
| 3,542,666 A | 11/1970 | Simpson | 208/11 |
| 3,969,247 A | 7/1976 | Emmett, Jr. et al. | 210/68 |
| 4,115,265 A | 9/1978 | Otte et al. | 210/68 |

(Continued)

FOREIGN PATENT DOCUMENTS

| | | |
|---|---|---|
| DE | 878795 C | 7/1949 |
| DE | 1461502 A1 | 1/1969 |

(Continued)

OTHER PUBLICATIONS

Ehrfeld et al, DE 10050733, English Machine Translation, pp. 1-19.*

(Continued)

*Primary Examiner* — Nam Nguyen
*Assistant Examiner* — Claire Norris
(74) *Attorney, Agent, or Firm* — Slayden Grubert Beard PLLC (57) ABSTRACT

A filter device for filtering a suspension comprises at least one filter for continuous creation of a filter cake containing particles from the suspension; at least one dispensing device configured to apply at least one first wash liquid to the filter cake created by the at least one filter; and at least one steaming unit configured to steam the filter cake using steam, wherein the at least one dispensing device is integrated into a first process chamber and the at least one steaming unit is integrated into a second process chamber separated from the first process chamber by at least one partition wall. The at least one first wash liquid and a second wash liquid used for creating the steam may have boiling temperatures differing by at least 5° C.

17 Claims, 4 Drawing Sheets

(56) References Cited

U.S. PATENT DOCUMENTS

| | | | | |
|---|---|---|---|---|
| 4,205,541 A | * | 6/1980 | Zucker | 68/200 |
| 4,240,897 A | | 12/1980 | Clarke | 208/11 LE |
| 4,311,561 A | * | 1/1982 | Hastings | 196/14.52 |
| 4,477,351 A | * | 10/1984 | Kobayashi | 210/396 |
| 4,529,496 A | * | 7/1985 | Kruyer | 210/644 |
| 4,539,097 A | * | 9/1985 | Kelterborn et al. | 208/390 |
| 4,695,381 A | * | 9/1987 | Ragnegard | 210/403 |
| 4,840,704 A | * | 6/1989 | Seymour | 162/49 |
| 4,968,412 A | | 11/1990 | Guymon | 208/390 |

FOREIGN PATENT DOCUMENTS

| | | | |
|---|---|---|---|
| DE | 2558794 A | | 7/1977 |
| DE | 102007039453 A1 | | 2/2009 |
| DE | 10050733 | * | 5/2009 |
| EP | 2366759 A1 | | 9/2011 |

OTHER PUBLICATIONS

Bettelheim et al "Introduction to General, Organic, and Biochemistry" 11th Edition, Cengage Learning, 2014, p. 138.*

Bottlinger, M., et al., "Steam Pressure Filtration for the Treatment of Limey Soils Contaminated with Aliphatic Hydrocarbons", $2^{nd}$ Int. Containment & Remediation Technology Conference, Orlando, Florida; 3 pages, Jun. 2001.

Peuker, U.A., "Abtrennung von Organischen Lösemitteln aus Filterkuchen mit Dampf (Separation of Organic Solvents from Filter Cakes with Steam)", F&S Filtrieren und Separieren, vol. 17, No. 5; pp. 230-236, 2003.

Peuker, U.A., "Applying Mechanical-Thermal Filtration Processes for Purification, e.g. Solvent Removal", Proc. Filtech Europe, Düsseldor, DE; 9 pages, Oct. 2003.

Peuker, U.A., et al., "Steam Pressure Filtration: Mechanical-Thermal Dewatering Process", *Drying Technology*, vol. 19, No. 5; pp. 807-848, 2001.

* cited by examiner

FILTER DEVICE, METHOD FOR ITS OPERATION AND USE THEREOF

CROSS-REFERENCE TO RELATED APPLICATIONS

This application claims priority to EP Patent Application No. 11164457 filed May 2, 2011. The contents of which is incorporated herein by reference in its entirety.

TECHNICAL FIELD

The disclosure relates to a filter device for filtering a suspension, comprising at least one filter for continuous creation of a filter cake containing particles from the suspension, with the at least one filter being configured to supply the filter cakes of at least one dispensing device one after the other for applying at least one wash liquid to the filter cakes and at least one steaming unit for steaming the filter cake by means of steam. The disclosure further relates to a method for operating the filter device and to use of the filter device for extraction of hydrocarbons from oil sand.

BACKGROUND

An oil sand usually consists of a mixture of clay substance, silicates, water and hydrocarbons. The oil phase contained up to 18% in oil sands consisting of various hydrocarbons has a very different composition, often specific to the extraction area, wherein bitumen, crude oil and asphalt can be contained therein. The processing of oil sand is carried out with the aim of separating the stone or sand fraction comprising clay substance and silicates from the actual valuable material, i.e., the oil phase comprising the hydrocarbons.

Oil sands are frequently extracted in open cast workings. For extraction from deeper layers of the earth preprocessing is often undertaken, in which the steam is introduced into the deposits, the hydrocarbons are liquefied and collected at drilling rigs and bought to the surface.

U.S. Pat. No. 4,240,897 describes a method for extraction of bitumen from oil sand by means of hot water.

DE 10 2007 039 453 A1 describes a method for obtaining bitumen from oil sand-water mixtures by means of flotation.

According to the CLARK-ROWE process, oil sand is mixed with sodium hydroxide and the oil sand phase is mobilized thereby. A water-oil phase separation is primarily undertaken by flotation. The remaining stone or sand component still contains up to 10% of the oil phase after the extraction, which in part is bound adsorptively to the surface of the finest particles. This leads to a steric stabilization of these particles in the waste water flow of the process, making separation of these particles very much more difficult. Furthermore a significant amount of clay substance is so greatly hydrophobized by an adsorptive agglomeration of the oil phase so that this gets into the product during a flotation, i.e. the separated oil phase. The clay substance represents a quality-reducing contamination there, which can only be separated again with difficulty. Depending on oil sand composition, to obtain a barrel of oil phase around three to four times the amount of non-recyclable fresh water is needed. The water is stored temporarily or finally in collection basins with the separated stone or sand fraction.

U.S. Pat. No. 4,968,412 describes a two-stage method for removal of bitumen from oil sand, in which in a first step organic solvents are supplied and the clay substance is separated. In a second step the processed oil sand is washed with water while adding surfactants.

U.S. Pat. No. 3,542,666 describes a method for extraction of hydrocarbons from oil sand, in which organic solvents in combination with a small amount of water are mixed in specific quantity ratios with the oil sand to a suspension and the pH value of the suspension is set to at least 5 before there is filtration of the suspension.

The unpublished European patent application with the file reference EP 10156735 describes a method for extraction of hydrocarbons from oil sand. It has been shown that a use of purely organic extraction means leads to the finest components which predominantly consist of clay substance agglomerating in the oil sand and the agglomerates additionally exhibiting a hydrophobic behavior. This makes possible a separation of the clay substance with the stone and sand fraction by means of a mechanical solid-liquid filtration. In this process the oil sand is suspended with organic solvents and filtered by means of a continuous filter, especially a drum filter. The filter cake formed is washed in a filter unit by means of at least one first wash liquid and subsequently steamed with a steam formed from a second wash liquid, wherein residues still present in the filter cake of the first wash liquid(s), including possible hydrocarbon residues, are driven out of the oil sand. The filter cake is cleaned and largely dehumidified in this case. In this case the application of the first wash liquid(s) to the filter cake can be undertaken by means of a dispensing device, which e.g. is realized by nozzles. The nozzles here are built into a chamber or a fluid of a steaming unit for steaming the filter cake with the steam consisting of the second wash liquid.

The driving out of the residual amount of first wash liquid from the filter cake is also referred to in the literature as steam pressure filtration.

Basics of steam pressure filtration are known and are described for example in the following publications:

"Steam Pressure Filtration: Mechanical-Thermal Dewatering Process", U. A. Peuker, W. Stahl, Drying Technology, 19(5), pages 807-848 (2001);

"Applying mechanical-thermal filtration processes for purification, e.g. solvent removal", U. A. Peuker, Proc. Filtech Europe, 12-23 Oct. 2003, Dusseldorf, Germany;

"Abtrennung von organischen Lösemitteln aus Filterkuchen mit Dampf" (Separation of organic solvents from filter cakes with steam), U. A. Peuker, F & S Filtrieren and Separieren, Volume (2003), No. 5, pages 230 to 236;

"Steam Pressure Filtration for the treatment of limey soils contaminated with aliphatic hydrocarbons", by M. Bottlinger, H. B. Bradl, A. Krupp, U. Peuker, $2^{nd}$ Int. Containment & Remediation Technology Conference, 10-13 Jun. 2001, Orlando, Fla., USA.

The filter cake, comprising the stone or sand fraction of the oil sand is freed from first wash liquid when the steam is pushed through it and at the same time a quantity of hydrocarbons or oil phase dissolved therein is driven out. This increases the yields of hydrocarbons or improves the separation degree to around 95 to 98%, which characterizes the separation success.

It has been shown that a combined design of dispensing device and steaming unit is able to be used if the first wash liquid supplied via the dispensing device and the second wash liquid from which the steam is formed are identical or at least similar in relation to the temperatures at which they boil, i.e. do not differ by more than around 5° C. in the boiling temperatures.

However if first and second wash liquids are used which differ by more than 5° C. in their boiling temperatures, undesired condensation or evaporation effects can occur in the chamber or hood of the steaming unit.

When a boiling temperature is referred to in this document this is always to be understood as the boiling temperature of a material under normal pressure.

If for example an organic solvent such as, e.g., ethanol with a boiling temperature of 78° C. is applied to the filter cake as the first wash liquid, and water with the boiling temperature of 100° C. as a second wash liquid is vaporized and the filter cake has the water vapor applied to it, a part of the first wash liquid already vaporizes in the chamber or hood before it has even reached the filter cake. This reduces the washing performance and also leads to an undesired buildup of pressure in the chamber or hood.

If conversely an organic solvent is applied to the filter cake as the first wash liquid, such as, e.g., toluol with a boiling temperature of 110° C. and water with the boiling temperature of 100° C. as the second wash liquid is vaporized and the filter cake has the water vapor applied to it then a part of the water vapor already condenses in the chamber or hood on the first wash liquid before it is even reached the filter cake.

This prevents the dehumidification of the filter cake and leads to an undesired fall in pressure in the chamber or hood.

SUMMARY

In one embodiment, a filter device for filtering a suspension comprises at least one filter for continuous creation of a filter cake containing particles from the suspension, wherein the at least one filter is configured to supply to the filter cakes one after the other of at least one dispensing device for applying at least one first wash liquid to the filter cakes and at least one steaming unit for steaming the filter cake by means of steam, wherein the at least one dispensing device is integrated into the first process chamber and the at least one steaming unit is integrated into a second process chamber, wherein the first process chamber and the second process chamber are released separated from one another by at least one partition wall.

In a further embodiment, a gap is able to be set between the at least one filter and the at least one partition wall. In a further embodiment, at least one measurement device is present for detecting a thickness d of the filter cake and the gap SW between the at least one filter and the at least one partition wall is able to be adjusted as a function of the thickness d of the filter cake. In a further embodiment, the at least one partition wall on its side facing towards the filter comprises at least one movable sealing unit. In a further embodiment, the movable sealing unit is formed by an elastic sealing lip.

In a further embodiment, the first process chamber and the second process chamber are separated from one another by an intermediate chamber, wherein the first partition wall is disposed between the first process chamber and the intermediate chamber and a second partition wall is disposed between the intermediate chamber and the second process chamber. In a further embodiment, the intermediate chamber is connected to at least one gas supply line for supplying a gas into the intermediate chamber. In a further embodiment, at least one gas pressure sensor is disposed in the intermediate chamber and the second process chamber respectively. In a further embodiment, a temperature sensor is assigned to the second partition wall on its side facing towards the intermediate chamber. In a further embodiment, the at least one filter is a rotary filter. In a further embodiment, the at least one filter is a drum filter or a disk filter or a pan filter or a band filter.

In another embodiment, a method for operating any of the filter devices discussed above is provided, in which the at least one first wash liquid and a second wash liquid used for creating the steam have boiling temperatures differing by at least 5° C.

In a further embodiment, the second wash liquid is formed from water. In a further embodiment, the at least one first wash liquid is formed from an organic solvent. In a further embodiment, a first respective gas pressure is detected by means of the gas pressure sensors in the intermediate chamber and the second gas pressure is detected in the second process chamber and a gas supply to the intermediate chamber is regulated such that the first gas pressure is higher than the second gas pressure. In a further embodiment, at least one temperature is measured by means of at least one temperature sensor and a gas supply to the intermediate chamber and/or a supply of steam to the second process chamber is regulated as a function of the temperature. In a further embodiment, the suspension to be filtered is formed from oil sand and at least one organic solvent.

In another embodiment, any of the filter devices discussed above may be used for extraction of hydrocarbons from oil sand, wherein the suspension to be filtered is formed from the oil sand and at least one organic solution.

BRIEF DESCRIPTION OF THE DRAWINGS

Example embodiments will be explained in more detail below with reference to figures, in which.

DETAILED DESCRIPTION

Some embodiments provide a filter device for filtering a suspension, with which wash liquids differing in their boiling temperatures by more than around 5° C. can be used as first and second wash liquids. Other embodiments provide a method of operation and a use of such a filter device.

More particularly, some embodiments provide a filter device for filtering a suspension, comprising at least one filter for continuous creation of a filter cake containing particles from the suspension, wherein the at least one filter is configured to supply to the filter cakes one after the other with a dispensing device for applying at least a first wash liquid to the filter cake and at least one steaming unit for steaming the filter cake by the at least one dispensing device being integrated into a first process chamber and the at least one steaming unit being integrated into a second process chamber, wherein the first process chamber and the second process chamber are separated from one another at least by at least one the partition wall.

Further, some embodiments of a method for operating such a filter device provide that the at least one first wash liquid and a second wash liquid for generating the steam have boiling temperatures differing by at least 5° C.

The spatial separation realized by the disclosed filter device between the dispensing device and the steaming unit may make it possible to largely exclude undesired interactions between the at least one first wash liquid and the steam from the second wash liquid. The at least one partition wall forms a barrier or a seal between the first and second process chamber, so that first wash liquid(s) and steam are kept spatially separated from one another and no longer come into direct contact with one another. In this way first and second wash liquids which may differ in their boiling temperatures by more than 5° C., e.g., by more than 10° C., can be used without problems. Undesired condensation or vaporization effects may be reduced or eliminated.

In certain embodiments of the method the second wash liquid may be formed from water, so that water vapor is created and is applied to the filter cake. The water vapor may be supplied as saturated vapor or slightly superheated steam. The at least one first wash liquid may be formed from an organic solvent. In such cases different first wash liquid can be applied by means of the dispensing device in turn to the filter cake. Details of this process can be found in EP 10156735 mentioned above. The use of organic solvents as first wash liquid(s) and of water as second wash liquid may be employed in certain embodiments.

The dispensing device may comprise a number of nozzles in the first process chamber for applying the first wash liquid(s) to the filter cake, wherein the nozzles may be disposed in one area in the first process chamber which is assigned to an entry area of the filter cake in the first process chamber. The first wash liquid applied to the filter cake forms a film which may flow against the filter movement.

Optionally the first process chamber has a pressure equalization in relation to the filter environment in order to prevent any possible undesired buildup of pressure in the first process chamber, such that atmospheric pressure may be achieved in the first process chamber.

The resistance to the penetration of steam from the second process chamber in the direction of the first process chamber may be increased in this case in respect of a resistance to penetration of steam from the second process chamber into the environment. This may be realized for example by the gap between filter cake and second process chamber at the exit of the filter cake from the second process chamber being dimensioned larger than in the area of the entry of the filter cake into the second process chamber. Thus the steam, when this is not sucked out through the filter cake and the filter tissue, may be directed away from the first process chamber out of the second process chamber.

In some embodiments, a gap width SW between the at least one filter and the at least one partition wall may be configured as an adjustable or configurable gap width. This may enable the sealing between first and second process chamber to be optimally adapted to the thickness of the filter cake which is formed on a filter tissue of the filter. This may be advantageous, for example, if process parameters change, such as a solid content of the suspension to be filtered for example, a speed of rotation of the filter, the state of the filter tissue etc.

The gap width SW can be changed by altering the position of the at least one partition wall relative to the filter. In this case the at least one partition wall may be moved, but as an alternative or in combination, the position of the filter can also be altered.

In some embodiments, at least one measurement device for detecting a thickness d of the filter cake and for the gap SW between the at least one filter and the at least one partition wall may be adjusted as a function of the thickness of the filter cake. This makes an automatic online setting of the distance between partition wall and filter cake possible so that sealing between the first and second process chamber is sufficient or optimum at all times and also under fluctuating process conditions.

A proven approach is for the at least one partition wall, on its side facing towards the filter, to comprise at least one movable sealing unit. This movable sealing unit can be formed by a movable flap, an elastic sealing lip, e.g., a laminar seal made of elastomer material and the like. Such a movable sealing unit can react quickly and reversibly to short-term changes to the distance between partition wall and filter cake and thus provide a permanent seal between filter cake and partition wall.

The first process chamber and the second process chamber may be separated from one another by an intermediate chamber, wherein a first partition wall is disposed between the first process chamber and the intermediate chamber and a second partition wall is disposed between the intermediate chamber and the second process chamber.

This increases the distance between first and second process chamber and may thus improve the sealing between said chambers.

The intermediate chamber may be linked to at least one gas supply line for supplying the intermediate chamber with a gas. Air or nitrogen may be blown in as the gas. The gas may be blown in this case in a quantity which is suitable for generating an increased pressure in the intermediate chamber—at least in respect of a pressure obtaining in the second process chamber. The blown-in gas may be pushed from the intermediate chamber into the second process chamber and optionally also into the first process chamber. Steam may be reliably prevented from escaping from the second process chamber into the intermediate chamber and consequently into the first process chamber.

It has proven useful in such cases for at least one gas pressure sensor to be disposed in the intermediate chamber and the second process chamber of the filter device in each case.

Using gas pressure sensors, at least a first gas pressure may be detected in the intermediate chamber and a second gas pressure in the second process chamber and a supply of gas to the intermediate chamber may be regulated such that the first gas pressure is higher than the second gas pressure. For example, the first gas pressure in the intermediate chamber may be increased by up to 50 mbar, e.g., up to 5 mbar, compared to the second gas pressure in the second process chamber.

In this case for example a valve or a fan can be present for supply of gas to the intermediate chamber, the valve setting or fan power of which is regulated for setting the first gas pressure in the intermediate chamber.

As an alternative or in combination to the above, at least the second partition wall, on its side facing towards the intermediate chamber, may be assigned at least one temperature sensor. Using the at least one temperature sensor, at least one temperature is measured and a supply of gas to the intermediate chamber and/or a supply of steam to the second process chamber may be regulated as a function of the measured temperature. If an increase in temperature is to be detected at the temperature sensor, steam leaves the second process chamber and penetrates into the intermediate chamber. On the one hand this can be counteracted by the first gas pressure in the intermediate chamber being increased and more gas being blown into the intermediate chamber.

On the other hand, with the supply of gas into the intermediate chamber remaining the same, the quantity of steam introduced into the second process chamber can be reduced in order to lower the second gas pressure and suppress the transfer of steam into the intermediate chamber.

The at least one filter of the filter device may be a rotary filter, e.g., a drum filter. However the filter can also be embodied as a disc filter, pan filter or band filter, for example.

In some embodiments, the suspension to be filtered may be formed from oil sand and at least one organic solvent.

The use of the filter device disclosed herein for extraction of hydrocarbons from oil sand, wherein the suspension to be filtered is formed from the oil sand and at least one organic solvent, has been proven.

For further details thereof the reader is referred to EP 10156735 cited above.

The thickness of the filter cake formed may lie in the range of 2 to 100 mm, e.g., in the range of 5 to 25 mm. A filter cake formed from residues of the oil sand, after being steamed with water vapor, is free of organic solvents and volatile hydrocarbons and can be returned directly, e.g. in the area of the oil sand extraction rig, into the ground. Separate storage of the separated stone or sand fraction is dispensed with. It can still contain only a small proportion of heavily-volatile hydrocarbons.

A mixture of at least two organic solvents may be used as the organic solvent which is suspended with the oil sand. Some embodiments use mixtures comprising at least two organic solvents from the group toluol, benzol, heptane or hexane. But other organic solvents may also be used. A pure organic solvent, e.g., in the form of toluol or heptane, can alternatively be used together with the oil sand to form the suspension to be filtered. It is likewise possible to use technical solvents such as paraffin, napta, benzine or kerosene with a variable chemical composition depending on manufacturing.

The chemical composition of the organic solvents used and of the first wash liquid(s) may be selected in such cases as a function of a molecule content of the oil sand containing 10 carbon atoms, e.g., voluminous molecules from the cyclo alkane and/or napta acids and/or asphaltene group. For this purpose the content of oil sand may be matched to such molecules.

For a purely aliphatic extraction a solubility of these types of voluminous molecules has proved to be a problem in a number of organic solvents. Thus for example for use of paraffins as extraction means the cyclo alkanes and napta acids occur as gel-type solid material structures, this reduces the yields and worsens the processability of the oil phase.

Figure 1:
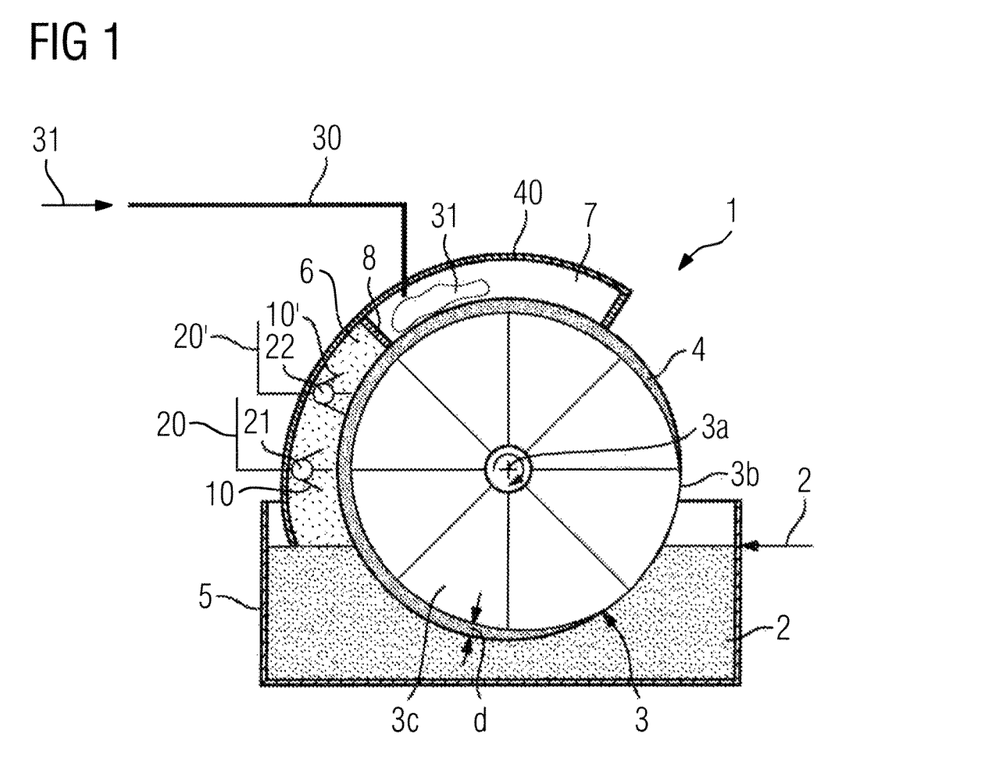
FIG. 1 illustrates a first filter device with a continuous filter in the form of the drum in a cross-sectional diagram.

FIG. 1 shows a schematic of a first example filter device 1 for filtering a suspension 2 in a cross-sectional diagram, according to an example embodiment. In this example embodiment, the filter device 1 comprises a container 5 to accommodate the suspension 2 as well as a filter 3 in the form of a continuous rotary filter. The rotary filter here is a drum spanned by filter material 3b, i.e., a drum filter, with a number of filter cells 3c separated from one another. The drum filter dips into the suspension 2 and is rotated in the direction of the arrow around an axis of rotation 3a (see arrow), wherein a pressure obtains at least in some of the filter cells 3c which is lower than that outside the filter material 3b. Through this liquid is sucked out of the suspension 2 through the filter material 3b into the respective filter cell 3c and a filter cake 4 forms on the filter material 3b, the thickness d of which increases the longer the filter material 3b remains in the suspension 2. The filter cake 4 comprises filterable particles of the suspension 2. If a suspension 2 is used which is formed for example from oil sand and organic solvents, the filter cake 4 contains clay substance agglomerates as well as other particles of the stone and sand fraction of the oil sand. An extract phase comprising hydrocarbons from the oil sand and organic solvents is separated and is removed from the filter cells 3c in the area of the axis of rotation 3a of the drum filter.

As a result of the continuous rotation of the drum filter around the axis of rotation 3a the filter cake 4 formed emerges on one side from the suspension 2 and first arrives in a first process chamber 6 in which a dispensing device 20, 20' comprising nozzles 21, 22 is disposed for application of at least one first wash liquid 10, 10' to the filter cake 4.

Thereafter the filter cake 4, because of the rotary movement of the drum filter, is conducted to a steaming unit, for steaming the filter cake 4 by means of steam 31. The steaming unit 30 is embodied here in the form of a tube for supplying steam and is integrated into a second process chamber 7. The steaming unit can alternatively also be embodied in the form of a specific application apparatus such as an expansion chamber for example.

The first process chamber 6 and the second process chamber 7 are embodied in this case by a hood 40 and separated from one another by a partition wall 8 connected to the hood 40. The partition wall 8 prevents a direct contact between the first wash liquid 10, 10' and the steam 31 and thereby undesired condensation or evaporation effects.

By means of the dispensing device 20, 20' an organic solvent, for example comprising a mixture of toluol and heptane, is applied to the filter cake 4 on a side facing away from the filter material 3b via the nozzles 21, 22 as the first wash liquid 10, 10'. The first wash liquid 10 expels a residual quantity of organic solvent with which the suspension 2 was formed from the open pore area of the filter cake 4. A number of different first wash liquids 10, 10' may be applied by means of the dispensing device 20, 20' one after the other to the filter cake 4.

The filter cake 4 is washed for example on its side facing away from the filter material by means of the nozzles 21 with a first wash liquid 10, formed from a mixture of toluol and heptane, and is subsequently washed by means of the nozzles 22 with a further first wash liquid 10' comprising pure hexane or heptane.

The hood 40 surrounds a part of the drum filter. The steam 31, here in the form of water vapor, is introduced via the filter cake 4 into the second process chamber 7 and is sucked out through the latter. In such cases a residual quantity of first wash liquid still remaining in the filter cake 4 comprising residues of hydrocarbons originating from the oil sand is removed. The steam 31 is pushed through the filter cake 4 and the filter cake 4 is dehumidified.

The quantities of extract phase penetrating into the filter cells 3c in each case are collected in the area of the axis of rotation 3a and are taken away from the first filter apparatus 1 by means of the unit not shown in detail here, for example in the form of a pipe. A largely dehumidified and solvent-free filter cake 4 remains as filter residue, which can be removed from the filter material 3b by compressed air for example and/or by a mechanical wiper and, e.g., returned to the ground at the location of the extraction workings of the oil sand.

The extract phase obtained by the first filter device 1 is conveyed to a processing system, which separates the hydrocarbons extracted from the oil sand and separates the organic solvent used in the most environmentally friendly way possible. The environmentally re-claimed solvents can be used again. This is not however shown in detail here for reasons of clarity. For more details the reader is referred to the content of EP 10156735.

Figure 2:
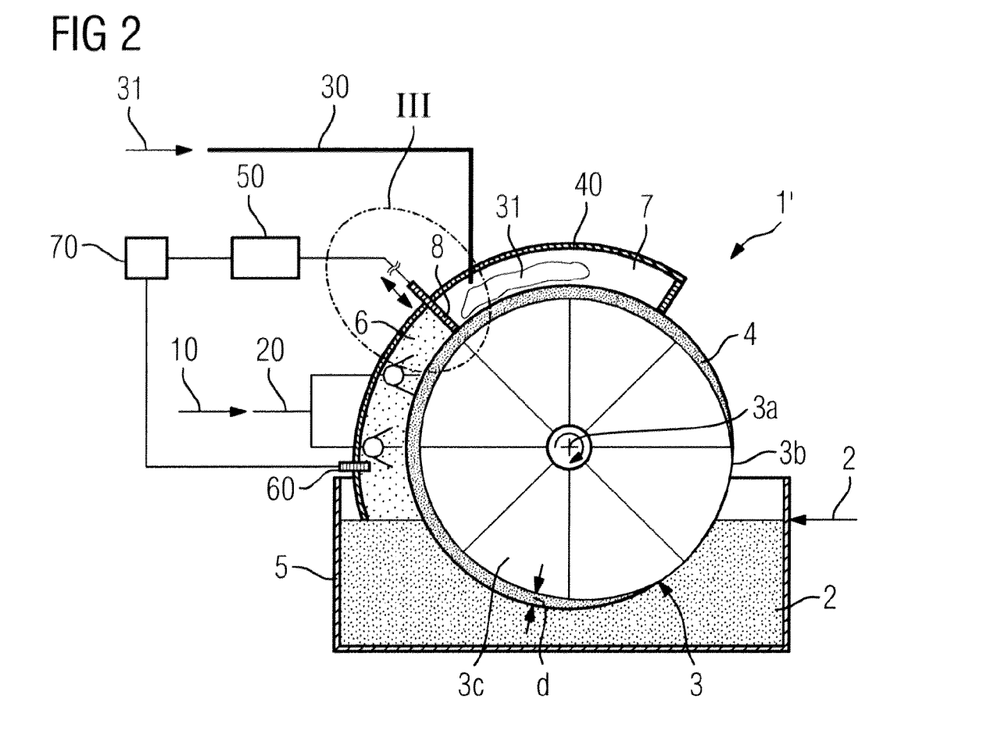
FIG. 2 illustrates a second filter device with a continuous filter in the form of a drum and an adjustable partition wall in a cross-sectional diagram.

FIG. 2 shows a second example filter device 1' similar to that shown in FIG. 1, in which a gap SW (see also FIG. 3) is able to be set between the filter 3 and the partition wall 8 (see double ended arrow). The same reference characters as in FIG. 1 refer to the same elements. A measurement device 60 for detecting the thickness d of the filter cake 4 is also provided, which transfers the current measured value for the thickness d to an open-loop and/or closed loop control unit 70. This calculates from the measured value for the thickness d of the filter cake 4 a signal for setting the gap SW between filter 3 and partition wall 8, which is transferred to a drive unit 50. The drive unit 50 causes the gap SW to be adapted to the current thickness d of the filter cake 4. The position of the separating wall 8 is set online as a function of the thickness d of the filter cake and will thus be fully minimized. The measurement device 60 for detecting the thickness d of the filter cake 4 can involve an optical measurement device or a mechanical measurement device.

Figure 3:
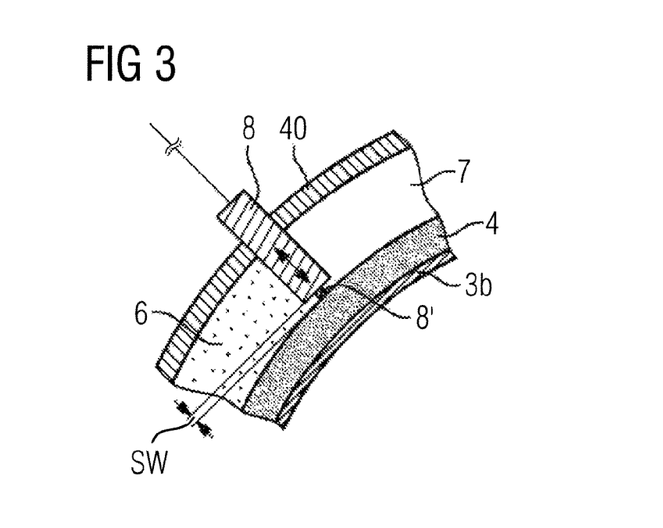
FIG. 3 illustrates an enlarged section from FIG. 2 in the area of the partition wall.

FIG. 3 shows a section from FIG. 2 in the area of the partition wall 8 enlarged for improved clarity. It can be seen in this figure that the partition wall 8 on its side facing towards the filter 3 has a movable sealing unit 8' in the form of an elastic sealing lip.

Figure 4:
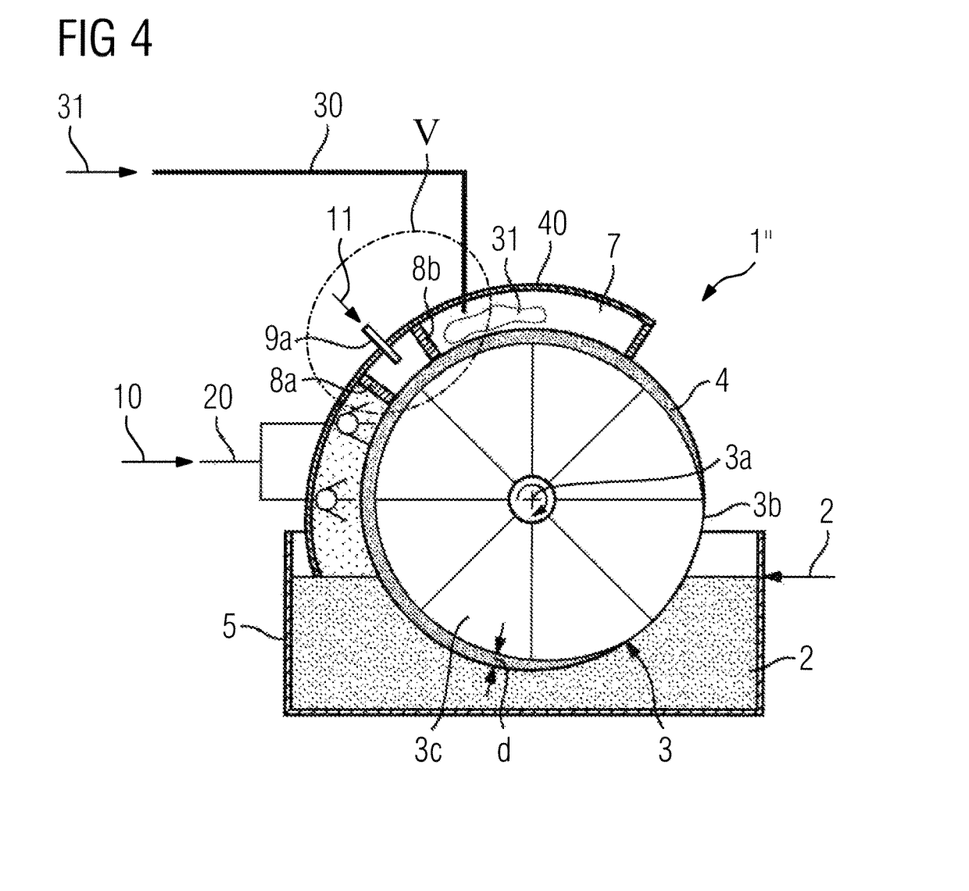
FIG. 4 illustrates a third filter device with a continuous filter in the form of a drum and an intermediate chamber in a cross-sectional diagram.

FIG. 4 shows a third filter device 1" similar to that of FIG. 1. The same reference characters as in FIG. 1 refer to the same elements. The first process chamber 6 and the second process chamber 7 are separated here by an intermediate chamber 9, wherein a first partition wall 8a is disposed between the first process chamber 6 and the intermediate chamber 9 and a second partition wall 8b between the intermediate chamber 9 and the second process chamber 7. The intermediate chamber 9 is connected to a gas supply line 9a to supply a gas 11 to the intermediate chamber 9.

Figure 5:
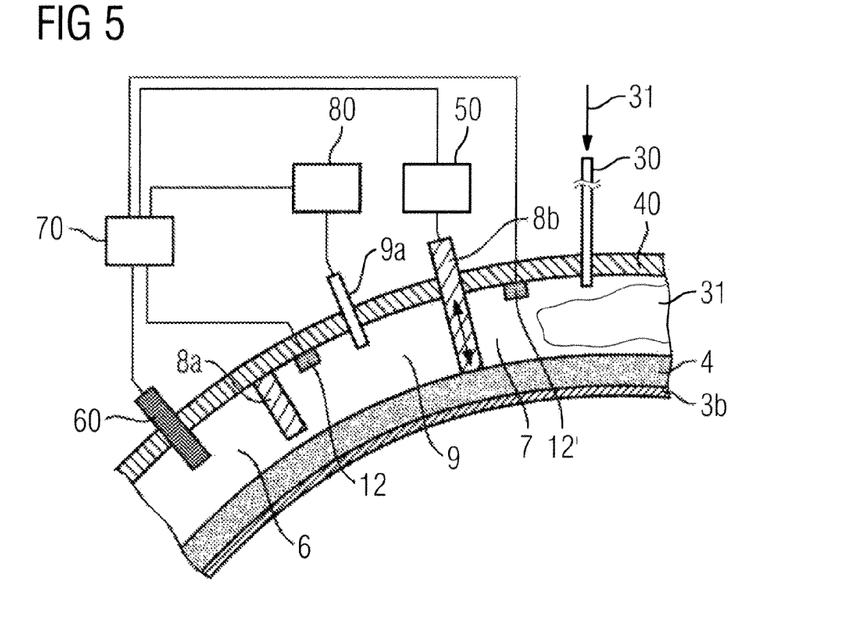
FIG. 5 illustrates a possible embodiment of the filter device similar to that of FIG. 4 in the area of the intermediate chamber.

FIG. 5 shows an example embodiment of a section of a filter device similar to FIG. 4 in the area of the intermediate chamber 9, wherein in the option shown here the second partition wall 8b, like the partition wall 8 shown in FIGS. 2 and 3, is embodied to be movable. The same reference characters as shown in FIGS. 1 to 4 identify the same elements. Arranged in the intermediate chamber 9 and a second process chamber 7 is a gas pressure sensor 12, 12' in each case. An open-loop and/or closed-loop control device 70 is connected for data communication to the gas pressure sensors 12, 12', the fan 80, the measurement device 60 and the drive unit 50. By means of the gas pressure sensors 12, 12' a first gas pressure is detected in the intermediate chamber 9 and a second gas pressure in the second process chamber 7 a gas supply to the intermediate chamber 9 via a fan 80 is regulated such that the first gas pressure is greater than the second gas pressure. This means that the steam 31 remains in the second process chamber 7.

Thus the thickness d of the filter cake 4 is detected and the second partition wall 8b is positioned via the drive unit 50 by means of the open-loop and/or closed-loop control device 70, and the quantity of gas blown into the intermediate chamber 9 via the fan 80 is set as a function of the first and second gas pressure.

In an alternative embodiment, the first gas pressure in the intermediate chamber 9 can remain constant and the supply of steam 31 into the second process chamber can be reduced, until the first gas pressure in the intermediate chamber 9 is higher than the second gas pressure in the second process chamber 7. A valve able to be adjusted by the open-loop and/or controlloop control device 70 as a function of the first second gas pressure can be provided for this purpose in the supply line for the steam 31.

Figure 6:
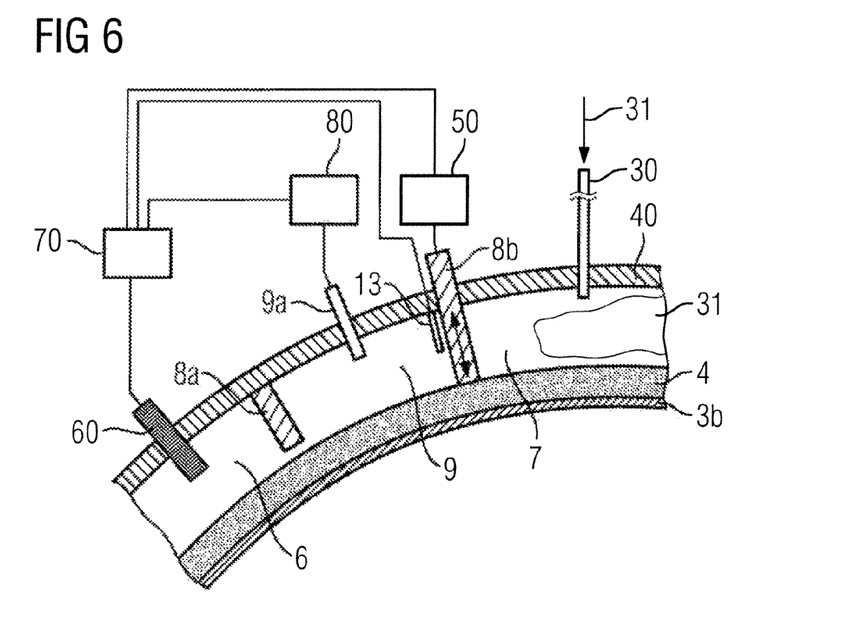
FIG. 6 illustrates a further possible embodiment of the filter device similar to that of FIG. 4 in the area of the intermediate chamber.

FIG. 6 shows a further possible embodiment of a section of a filter device similar to FIG. 4 in the area of the intermediate chamber 9, with the option also being shown here of the second partition wall 8b, like the partition wall 8 in FIGS. 2 and 3, being embodied movably. The same reference characters as in FIGS. 1 to 5 are used identify the same elements. A temperature sensor 13 is disposed in the intermediate chamber 9 here. A temperature of the temperature sensor 13 is measured in the area of the second partition wall 8b and a gas supply to the intermediate chamber 9 is regulated via a fan 80 as a function of the temperature. For this purpose the open-loop and/or closed-loop control device 70 is connected for data communication to the temperature sensor 13 and the fan 80.

Thus, as described for FIG. 5, the thickness d of the filter cake 4 is detected and the second partition wall 8b is positioned via the drive unit 50 by means of the open-loop and closed-loop control unit 70, and the quantity of gas 11 blown into the intermediate chamber 9 via the fan 80 is set as a function of the measured temperature in the area of the second partition wall 8b.

In an alternative embodiment, the supply of gas into the intermediate chamber 9 can be kept constant and the supply of steam 31 into the second process chamber reduced until the temperature at the temperature sensor 13 reaches a desired value and no more steam 31 enters the intermediate chamber 9. For this purpose a valve able to be adjusted as a function of the temperature via the open-loop and closed-loop control device 70 can be provided in the supply line for the steam 31.

FIGS. 1 to 6 merely show example embodiments of filter devices and methods for their operation. A person skilled in the art is readily able for example, instead of the drum filter shown here, to use a band filter, disk filter or other rotary filter. Furthermore, if a number of partition walls are present, as shown in FIGS. 4 to 6, all or just selected partition walls can be movable relative to the filter. In such cases a temporal correction between the movement sequences of partition walls to be moved one after the other can be realized.

What is claimed is:
1. A filter device for filtering a suspension, comprising:
at least one filter for creation of a filter cake containing particles from the suspension;
at least one dispensing device configured to apply at least one first wash liquid to the filter cake created by the at least one filter; and
at least one steaming unit configured to steam the filter cake using steam;
wherein the at least one dispensing device is integrated inside of a first process chamber to wash the filter cake and the at least one steaming unit is integrated inside of a second process chamber to steam the filter cake from the first process chamber, the second process chamber separated from the first process chamber by at least one movable partition wall extending downward toward the filter;
at least one measurement device configured to detect a thickness of the filter cake in the first process chamber; and a control device that controls a drive unit to move the at least one movable partition wall in and out to adjust the distance between the at least one filter and an end of the at least one partition wall based on the detected thickness of the filter cake from the first process chamber.

2. The filter device of claim 1, wherein the at least one movable partition wall comprises a sealing unit on a side facing the filter.

3. The filter device of claim 2, wherein the sealing unit comprises an elastic sealing lip.

4. The filter device of claim 1, wherein the first process chamber and the second process chamber are separated from one another by an intermediate chamber, wherein a first partition wall is disposed between the first process chamber and the intermediate chamber and a second partition wall is disposed between the intermediate chamber and the second process chamber.

5. The filter device of claim 4, wherein the intermediate chamber is connected to at least one gas supply line for supplying a gas into the intermediate chamber.

6. The filter device of claim 4, wherein at least one gas pressure sensor is disposed in each of the intermediate chamber and the second process chamber.

7. The filter device of claim 4, wherein a temperature sensor is disposed in the intermediate chamber at a location on or proximate the second partition wall.

8. The filter device of claim 1, wherein the at least one filter is a rotary filter.

9. The filter device of claim 1, wherein the at least one filter is one of a drum filter, a disk filter, a pan filter, and a band filter.

10. The filter device of claim 1, wherein the at least one dispensing device integrated into the first process chamber is configured to apply at least one first wash liquid to the filter cake, and wherein the second process chamber including the at least one steaming unit is arranged downstream of the first process chamber in a direction of movement of the filter cake.

11. A method for operating a filter device, comprising:
using at least one filter to create a filter cake containing particles from a suspension;
using at least one dispensing device to apply at least one first wash liquid to the filter cake created by the at least one filter; and
using at least one steaming unit to steam the filter cake, wherein the steam is created from a second wash liquid;
wherein the at least one dispensing device is integrated inside of a first process chamber to wash the filter cake and the at least one steaming unit is integrated inside of a second process chamber to steam the filter cake from the first process chamber, the second process chamber separated from the first process chamber by at least one movable partition wall extending downward toward the filter;
detecting a thickness of the filter cake using at least one measurement device; and
using a control device that controls a drive unit to move the at least one movable partition wall in and out to adjust the distance between the at least one filter and an end of the at least one partition wall based on the detected thickness of the filter cake from the first process chamber; and
wherein the at least one first wash liquid and the second wash liquid for creating the steam have boiling temperatures differing by at least 5° C.

12. The method of claim 11, wherein the second wash liquid is formed from water.

13. The method of claim 11, wherein the at least one first wash liquid is formed from an organic solvent.

14. The method as claimed of claim 11, further comprising:
detecting a first gas pressure using at least one gas pressure sensors in an intermediate chamber between the first process chamber and the second process chamber;
detecting a second gas pressure in the second process chamber; and
controlling a gas supply to the intermediate chamber such that the first gas pressure is higher than the second gas pressure.

15. The method of claim 11, further comprising:
measuring at least one temperature using at least one temperature sensor and;
controlling at least one of (a) a gas supply to an intermediate chamber between the first process chamber and the second process chamber and (b) a supply of steam to the second process chamber as a function of the measured temperature.

16. The method of claim 11, wherein the suspension to be filtered is formed from oil sand and at least one organic solvent.

17. The method of claim 11, wherein:
the suspension is formed from oil sand and at least one organic solution; and
the method further comprises:
collecting an extract phase of the suspension that passes through the at least one filter, the extract phase containing hydrocarbons;
conveying the extract phase to a processing system that extracts the hydrocarbons from the oil sand.

* * * * *

UNITED STATES PATENT AND TRADEMARK OFFICE
CERTIFICATE OF CORRECTION

| | | |
|---|---|---|
| PATENT NO. | : 9,486,721 B2 | Page 1 of 1 |
| APPLICATION NO. | : 13/462145 | |
| DATED | : November 8, 2016 | |
| INVENTOR(S) | : Urs Peuker | |

It is certified that error appears in the above-identified patent and that said Letters Patent is hereby corrected as shown below:

On the Title Page

Please add:

Item (30) Foreign Application Priority Data

February 5, 2011 (EP) ......................................... 11164457

Signed and Sealed this
Fourteenth Day of February, 2017

Michelle K. Lee
*Director of the United States Patent and Trademark Office*